United States Patent [19]

Bushey

[11] Patent Number: 5,351,171
[45] Date of Patent: Sep. 27, 1994

[54] WIDE-ANGLE-VIEWING SAFETY LIGHT FOR TOWING VEHICLES

[76] Inventor: Ronald P. Bushey, 77 Sweet Hill Rd., Plaistow, N.H. 03865

[21] Appl. No.: 994,263

[22] Filed: Dec. 21, 1992

[51] Int. Cl.$^5$ .................................. B60Q 1/02
[52] U.S. Cl. ..................... 362/80; 362/83.3; 362/251; 362/263; 362/267
[58] Field of Search ............ 362/61, 80, 83.3, 82, 362/83, 230, 240, 249, 252, 263, 267, 227, 251

[56] References Cited

U.S. PATENT DOCUMENTS

| | | | |
|---|---|---|---|
| 2,065,976 | 12/1936 | Siegfried | 362/80 |
| 2,538,854 | 1/1951 | Wyatt | 362/80 |
| 3,005,089 | 10/1961 | Robbins | 362/80 |
| 3,196,265 | 7/1965 | Schneider | 362/82 |
| 4,192,427 | 3/1980 | Bergmann | 362/61 |
| 4,569,002 | 2/1986 | English et al. | 362/80 |
| 4,707,767 | 11/1987 | Bergin et al. | 362/61 |
| 4,740,871 | 4/1988 | Dilouya | 362/80 |
| 4,920,460 | 4/1990 | Mori | 362/61 |
| 5,067,055 | 11/1991 | Farnsworth | 362/66 |
| 5,081,565 | 1/1992 | Nabha et al. | 362/61 |
| 5,084,805 | 1/1992 | Goto | 362/61 |
| 5,101,326 | 3/1992 | Roney | 362/61 |
| 5,172,972 | 12/1992 | Terao | 362/61 |

FOREIGN PATENT DOCUMENTS

| | | | |
|---|---|---|---|
| 0149159 | 4/1937 | Austria | 362/61 |
| 1031294 | 6/1953 | France | 362/74 |
| 1190704 | 10/1959 | France | 362/61 |
| 462396 | 3/1951 | Italy | 362/61 |
| 0415914 | 9/1934 | United Kingdom | 362/80 |
| 1067845 | 5/1967 | United Kingdom | 362/61 |

*Primary Examiner*—Ira S. Lazarus
*Assistant Examiner*—Alan Cariaso
*Attorney, Agent, or Firm*—Donald W. Meeker

[57] ABSTRACT

High intensity beam lights are mounted on each side of a towing vehicle in units of two or three beams positioned at diverging angles creating a 180-degree lighted area. The lights are activated by a control switch in the driving compartment both simultaneously or each side separately. Replaceable sealed beam units are housed in casings attached to the sides of the body of the vehicle adjacent to the driving compartment. The wide angle safety lighting system provides a wide field of vision necessary for turning or backing vehicles towing trailers or other units.

13 Claims, 1 Drawing Sheet

WIDE-ANGLE-VIEWING SAFETY LIGHT FOR TOWING VEHICLES

BACKGROUND OF THE INVENTION

1. Technical Field

The present invention relates to safety lights for vehicles and in particular to wide-angle safety lights for a vehicle towing another unit for viewing obstacles in backing up and turning.

2. Description of the Prior Art

When a vehicle is towing a trailer, another vehicle or any other type of towed unit behind it, the backing and turning process is very much complicated by the extra length and the presence of the towed unit. At these times viewing of any obstacles is extremely important to aid in the safe maneuvering of the vehicle and the towed unit. Night driving or backing into dark areas such as garages or alleys even in the day time necessitates lighting means for viewing potential obstacles in the path of the vehicle.

Presently some vehicles are equipped with backup lights which turn on automatically upon shifting into reverse. Re lights shine straight back and may not be used for effective side viewing. Vehicles towing other units turn through a wider path than single vehicles, and the backup lights fall to illuminate the entire path through which the vehicle turns. When a trailer is towed behind the vehicle the backup light no longer functions because the trailer blocks the light. Even if a towed unit has a backup light, obstacles on the side of the vehicle and towed unit are not illuminated.

Most existing vehicles are provided with side lights for safe/purposes so that oncoming vehicles will see the vehicle and avoid a collision. The side safety lights do not cast any appreciable light to the side for viewing potential obstacles in the path of a turning or backing vehicle.

U.S. Pat. No. 4,024,497 describes a small light mounted over the rear wheels of a trailer and a separate rear light mounted on the back of a trailer. Relights are only activated when the directional and emergency light signals are operated. Relying on each side lighted separately by the directional signals Ignores the fact that sweeping turns with a vehicle having a unit in tow require viewing in all directions on both sides of the vehicle to prevent the front, back and sides of both the vehicle and the towed unit from striking anything. Relying on the running lights of the vehicle to be activated requires activation of the entire lighting system of the truck in daylight when maneuvering into a dark alley or garage. Straight mounted side lights provide only a light directly to the side and do not permit wide angle viewing. Straight mounted rear lights are of limited value because the trailer itself obstructs much of the view of the area lighted by a straight mounted light. The tractor itself has no side lights and if the tractor is pulling a different trailer there would be no such lights.

DISCLOSURE OF INVENTION

Providing a wide-angle multiple spotligh-type high intensity lighting system on both sides of a vehicle used to tow another unit lights the entire turning or backing area visible to the operator of the vehicle directly or through the side mirrors. Maneuvering turns or backing up on dark spaces is accomplished with a full view of any potential obstacles, thereby avoiding accidents.

Having a side mounted light with separate side, front and rear oriented high intensity beams casts light effectively around an angle of 180 degrees, lighting the entire area surrounding the sides front and rear of the vehicle. Re greater the angle between the vehicle and the trailer the more of the area behind the trailer is lighted.

Providing a control inside the vehicle which activates both side wide-angle lights at once al lows the operator to look back and forth out both sides of the vehicle to assure that the back, sides and front of both the towed unit and the towing vehicle avoid bumping into something. A sweeping lighted view permits a safe sweeping turn required in turning a vehicle with a unit in tow. Long trailers require sweeping turns in a forward direction as well as a backward direction and the control of the wide-angle view lights permits use for any driving situation, not relying on activation of a turn signal or emergency flashers or shifting into reverse.

Mounting the wide-angle high intensity safety lights on the towing vehicle assures that the vehicle will always have the necessary light and not rely on a trailer or towed unit which may or may not be equipped with viewing lights. It further insures safer turning and backing of the vehicle itself even when it is not towing, especially helpful if the view out the rear window is obscured by passengers, baggage or condensation.

Mounting the wide-angle high intensity side safety lights in the cab of a towing vehicle near the operator provides optimum use of the lights because they will illuminate the operator's entire field of view.

Having high intensity wide angle lights on both sides of the vehicle during turning and backing maneuvers creates safety lights which are highly visible to any oncoming vehicles.

BRIEF DESCRIPTION OF THE DRAWINGS

These and other details and advantages of my inventieon will be described in connection with the accompanying drawings, which are furnished only by way of illustration and not in limitation of the invention, and in which drawings.

BEST MODE FOR CARRYING OUT THE INVENTION

Figure 1:
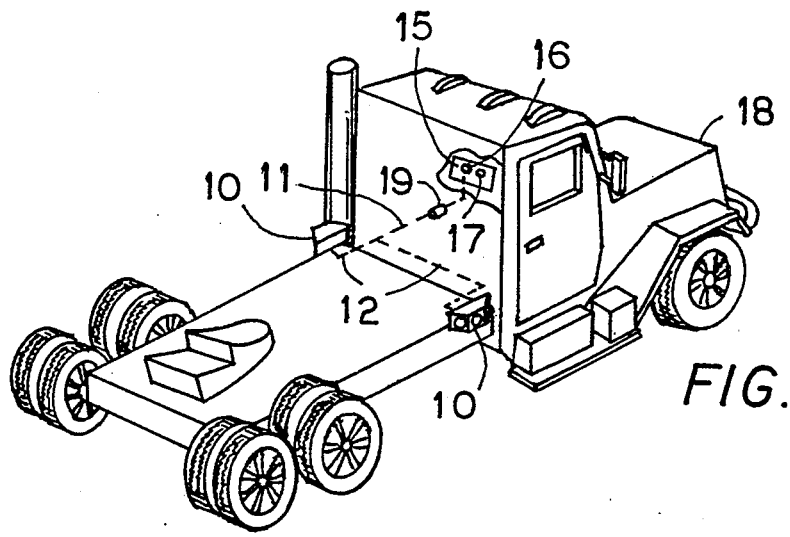
FIG. 1 is a perspective view of a truck tractor for towing a trailer showing the invention mounted on the truck tractor adjacent to the cab on each side of the tractor.
Figure 2:
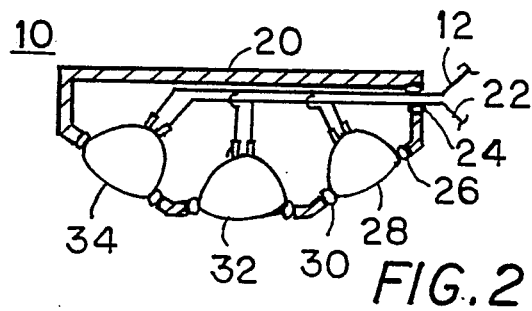
FIG. 2 is a plan view in partial section of a three-beam lighting unit in its casing.

In FIGS. 1 and 2 a wide-angle high intensity safety lighting system 10 for vehicles comprises three high intensity beam lights 28, 32 and 34 mounted side by side at diverging light-directing angles. Together the beams direct light over a 180 degree sweep on each of two sides of a vehicle as seen in FIGS. 4 and 5, where the dashed lines represent the edges of the fields of light covering the area marked by arcs 70, 72, 74, and 76.

A housing 20 fabricated of aluminum, stainless steel or plastic electrically insulates and protects the lights from weather conditions. Wires 12 serve as electrical connecting means from the lights to a control panel 15 inside a driving compartment of the vehicle. The wires 12 from each set of wide angle lights connect to a single wire 11 leading to the control panel. An in-line fuse 19 may be used as a safety feature. A ground wire 22 from each housing attaches to the frame of the vehicle as a ground. A single switch 16 activates and deactivates the lights on both sides of the vehicle exclusive of other lights on the vehicle.

Figure 4:
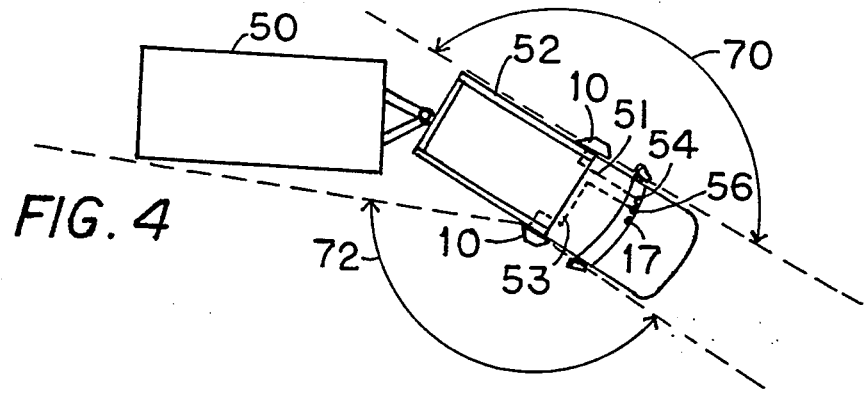
FIG. 4 is a plan view of a pickup truck towing a trailer with the invention mounted on each side of the truck adjacent to the driving compartment of the truck.
Figure 5:
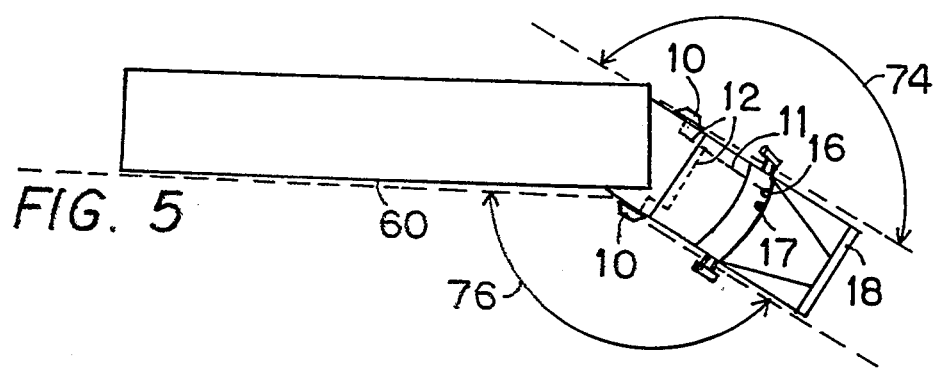
FIG. 5 is a plan view of a tractor trailer truck towing a trailer with the invention mounted on each side of the tractor adjacent to the cab of the tractor.

In an alternate embodiment of the invention in FIG. 4 separate wires 51 and 53 lead from each side lights unit to a separate switch 54 and 56 respectively so that the two different sides may be controlled separately. For both embodiments an indicator light 17 is positioned inside the driving compartment of the vehicle visible to the operator. The indicator light on the panel of the vehicle is activated when the wide-angle safety lighting system is activated.

In FIG. 2 three sealed beam lights, preferably quartz halogen driving lights, are mounted with a central light having its centerline perpendicular to the side of the housing and consequently also perpendicular to the side of the vehicle. Each of two adjacent lights 28 and 34 have centerlines diverging away from the central light at an acute angle, preferably 30 degrees, away from the central light.

Figure 3:
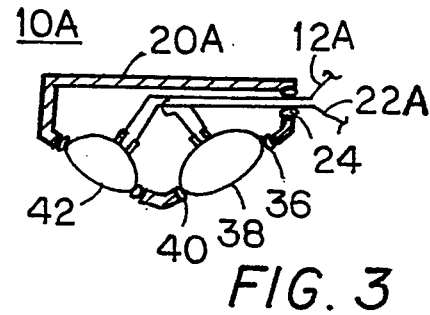
FIG. 3 is a plan view in partial section of an alternate embodiment having a no-beam lighting unit in its casing.

In FIG. 3 an alternate embodiment of the invention 10A provides a housing 20A with two sealed beam units 38 and 42 housed therein with the centerlines of the lights diverging away from each other preferably at ninety degrees or slightly less. Both housings 20 and 20A are provided with rubber gaskets 24, 26, 30, 36 and 40 around the openings to seal out water and help insulate the beams electrically.

In FIG. 4 a pickup truck 52 has the invention 10 mounted on both sides of the truck adjacent to the driving compartment of the truck for a sweeping 180 degree lighted area on both sides of the truck 52 and trailer 50 for seeing any obstacles on either side to aid in making safe sweeping turns and backing up with trailer 50 mounted on the truck.

In FIG. 5 a tractor trailer truck 18 has the invention 10 mounted on both sides of the tractor adjacent to the cab of the tractor for a sweeping 180 degree lighted area on both sides of the tractor trailer for seeing any obstacles on either side and to aid in making safe sweeping turns and backing up with the trailer 60 mounted on the truck.

Any multiple number of replaceable sealed beam units may be used in a housing to provide a broad lighted area surrounding the vehicle.

It is understood that the preceding description is given merely by way of Illustration and not in limitation of the invention and that various modifications may be made thereto without departing from the spirit of the invention as claimed.

I claim:

1. A wide-angle high intensity safety lighting system for lighting the entire turning area of towing vehicles, wherein each towing vehicle is towing a trailer, wherein the towing vehicle has a right side and a left side, wherein the towing vehicle and trailer cover a wide turning area in turning right or left in backward and forward movements, and wherein the wide-angle high intensity safety lighting system comprises:

at least two high intensity beam driving lights mounted on and protruding from each of two sides of a towing vehicle, wherein the high intensity lights are positioned side by side at diverging light-directing angles, directing light in a 180 degree sweep on each of the two sides of the towing vehicle, wherein light from the lighting system extends outwardly from the towing vehicle to encompass an entire turning area of the towing vehicle and trailer.

a housing means for protecting the lights and electrically insulating the lights;

an electrical connecting means connecting lights to a control panel inside a driving compartment of the vehicle;

a switching means for activating and deactivating the lights exclusive of other lights on the vehicle.

2. The invention of claim 1 wherein the switching means comprises a single switch for activating the lighting system on both of the two sides of the towing vehicle.

3. The invention of claim 1 wherein the switching means comprises a separate switch for activating the lighting system on each of the two sides of the towing vehicle.

4. The invention of claim 1 wherein the lighting system comprises three lights mounted on and protruding from each of the two sides of the towing vehicle mounted with a central light having a centerline of the central light perpendicular to each of the two sides of the towing vehicle and each of two adjacent lights having centerlines diverging at an acute angle away from the central light.

5. The invention of claim 4 wherein the acute angle is thirty degrees.

6. The invention of claim 1 wherein the lighting system comprises two adjacent lights mounted on and protruding from each of the two sides of the towing vehicle mounted with a centerline of each housing means perpendicular to each of the two sides of the towing vehicle on which the housing means is mounted and each of the two adjacent lights having centerlines in each housing means diverging at an acute angle away from the housing means centerline.

7. The invention of claim 6 wherein the acute angle is at most forty-five degrees.

8. The invention of claim 1 further comprising an indicator light inside the driving compartment of the towing vehicle visible to the driver, which indicator light is activated when the wide-angle high intensity safety lighting system is activated.

9. A wide-angle high intensity safety lighting system for lighting the entire turning area of towing vehicles, wherein each towing vehicle is towing a trailer, wherein the towing vehicle has a right side and a left side, wherein the towing vehicle and trailer cover a wide turning area in turning right or left in backward and forward movements, and wherein the wide-angle high intensity safety lighting system comprises:

at least two high intensity beam driving lights mounted on and protruding from each of two sides of a towing vehicle, wherein the high intensity lights are positioned side by side at diverging light-directing angles, directing light in a 180 degree sweep on each of the two sides of the towing vehicle, wherein light from the lighting system extends outwardly from the towing vehicle to encompass an entire turning area of the towing vehicle and trailer;

a housing means for protecting the lights and electrically insulating the lights;

an electrical connecting means connecting the lights to a control panel inside a driving compartment of the towing vehicle, wherein the electrical connecting means comprises a wiring system with a negative ground connected to a frame of the towing vehicle and an in-line fuse means;

a switching means for activating and deactivating the lights exclusive of other lights on the vehicle.

10. The invention of claim 9 wherein each light is a sealed beam unit plugged into the electrical connecting means, which sealed beam unit is replaceable.

11. The invention of claim 10 wherein each light is a quartz halogen driving light.

12. The invention of claim 1 wherein the high intensity beam lights are mounted on each of the two sides of the towing vehicle adjacent to a driving compartment of the towing vehicle.

13. The invention of claim 1 wherein the electrical connecting means comprises a wiring system with a negative ground connected to a frame of the vehicle and an in-line fuse means.

* * * * *